S. A. STRICKLAND.
PUMP.
APPLICATION FILED OCT. 18, 1916. RENEWED NOV. 10, 1919.
1,334,567.
Patented Mar. 23, 1920.
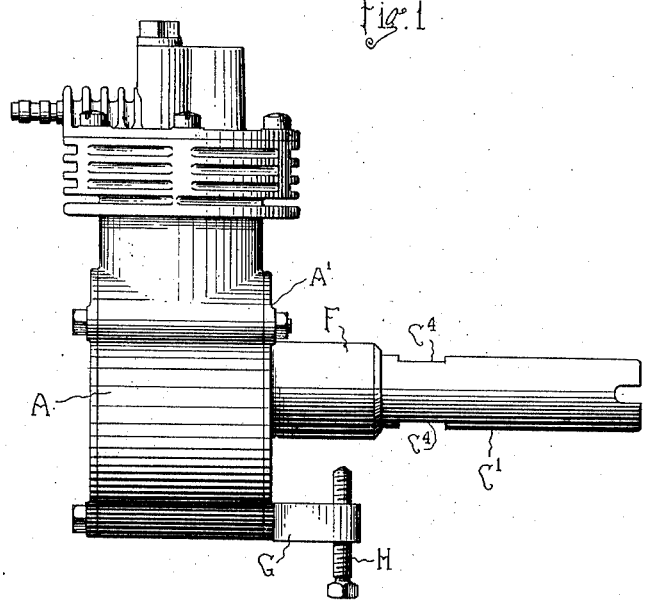
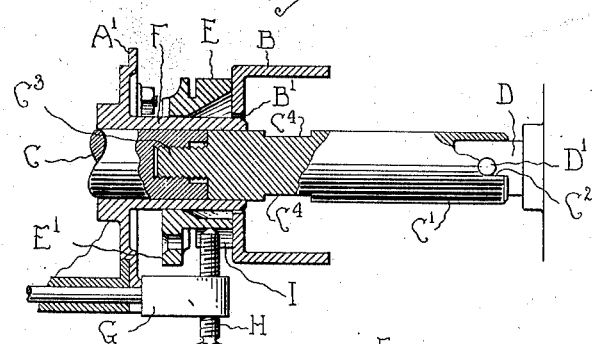
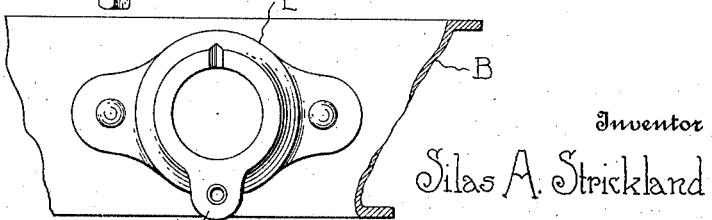
Witnesses
Arthur F. Draper
Karl H. Butler
Inventor
Silas A. Strickland
By
Attorneys

UNITED STATES PATENT OFFICE.

SILAS A. STRICKLAND, OF DETROIT, MICHIGAN, ASSIGNOR TO DETROIT ACCESSORIES CORPORATION, OF DETROIT, MICHIGAN, A CORPORATION OF MICHIGAN.

PUMP.

1,334,567.          Specification of Letters Patent.          Patented Mar. 23, 1920.

Application filed October 18, 1916, Serial No. 126,432. Renewed November 10. 1919. Serial No. 337,050.

*To all whom it may concern:*

Be it known that I, SILAS A. STRICKLAND, a citizen of the United States of America, residing at Detroit, in the county of Wayne and State of Michigan, have invented certain new and useful Improvements in Pumps, of which the following is a specification, reference being had therein to the accompanying drawings.

This invention relates to devices of that class shown in my Letters Patent No. 1150977 of August 24, 1915, for detachably connecting a pump to the motor of a vehicle and rigidly and detachably supporting and holding the same in operative position, so that it may be quickly applied for use and may be readily detached and stored in the tool box of the vehicle when not in use.

The object of this invention is to provide simple and efficient means for the purpose, particularly adapted for use upon certain well-known makes of motor cars without change in their standard construction and which means is so arranged as to firmly hold the pump against longitudinal or rotative movement and to permit a limited adjusting movement to provide for inaccuracies in the alinement of the motor car parts.

To these ends, the invention consists in the matters hereinafter set forth and more particularly pointed out in the appended claims, reference being had to the accompanying drawing in which—

Figure 1 is a side elevation of a pump embodying the invention;

Fig. 2, a sectional detail illustrating the manner of attaching the same to a motor vehicle, parts of a vehicle being shown in vertical section and a shaft of an engine thereon indicated in elevation, and Fig. 3 is a detail of a supporting cross member of a vehicle, showing the same in front elevation.

By means of this invention, a small portable air pump A may be retachably applied to the front cross member B of an automobile chassis, with the pump shaft C, with a separable part C' thereof projecting through the opening B' in the cross member, which opening is provided for the insertion of a hand starting-crank (not shown) therethrough into engagement with the forwardly projecting end of an engine crank shaft indicated at D in Fig. 2 and provided with a cross-pin D' which is adapted to engage a suitable jaw on the starting crank or a slot $C^2$ in the inwardly-bored end of the extension C' of the pump shaft, said bore being adapted to receive and loosely fit the end of the engine shaft. Instead of making the pump shaft C with the extension, as shown, it may be a solid shaft having the end axially-bored to receive the engine shaft, the advantage in making said shaft in two parts being that, when so made, an extension formed to engage an engine shaft having a different form or provided with other means than the pin D', may be substituted for the one shown, where it is desired to apply the pump to a construction other than that shown. The separable part C' is rigidly attached to the main part of the pump shaft C by providing said shaft with a screw-threaded bore to receive a reduced and screw-threaded end portion $C^3$ on the separable part, and to provide a wrench-hold for facilitating the screwing together of the parts, the extension is formed with flattened portions $C^4$.

In the vehicle construction shown, the cross member B is provided with a tubular member E riveted or otherwise secured thereto over the hole B' therein and forming a guide bearing for the starting crank and also for a collar or hub F formed integral with the casing or a cover plate A' therefor, said hub or collar forming a bearing for the projecting end of the pump shaft C. Said member E thus forms a rigid bearing to rigidly support the pump independently of its shaft with said shaft in substantial alinement with the engine shaft D.

It may be found in certain instances that said engine shaft D does not aline perfectly with the opening B' and the axis of the tubular member E, and to provide for such dis-alinement, the tubular member is preferably counter-bored to provide a short bearing surface at its outer end to be engaged by the hub F which is thus permitted to tilt slightly therein for the purpose of bringing the inner end of the separable part C' into engagement with the engine shaft. If found desirable, the hub or collar F may be formed to permit of such adjustment or tilting movement.

To hold the pump in place after its hub F has been inserted in the member E with the inner end of its shaft engaged with the engine shaft, a lug or ear G is provided on the pump casing and this lug has a screw-threaded opening to receive a suitable screw H extending toward the axis of the pump shaft and adapted to be turned into engagement with the member E, the end of said screw engaging a notch I in said member to prevent the rotation of the pump casing about the axis of its shaft when power is transmitted to said shaft from the engine shaft by the pin D'. The turning of the screw H into firm engagement with the member E also prevents longitudinal movement of the pump collar F in said member and the dislodgment of the pump from its support and the inner end of the pump shaft from the engine shaft.

The member E is provided with an ear E' for the pivotal attachment thereto of a cover (not shown) for closing the opening through the member when the pump is not in place, and this cover may be swung out of the way or removed when the pump is applied.

The screw H extends substantially at right angles to the axis of the pump shaft or radially toward said axis and thus it will exert a force to draw the collar F into firm engagement with one side of the bearing opening in said member E and firmly clamp the pump casing in place independently of the pump shaft which is thereby supported in substantial alinement with its driving or engine shaft and held in driving engagement therewith.

Obviously, the construction shown is applicable to motor vehicles having a construction and arrangement of parts different from that shown and changes may be made to adapt the same to such constructions, within the scope of the appended claims, without departing from the spirit of this invention.

Having thus fully described my invention, what I claim is:—

1. In combination, a support, a driving shaft, a pump body, a pump shaft projecting from the body in substantial alinement with the driving shaft and rotatable with the latter, and a screw carried by said pump body, said screw having its axis in a plane at an angle to the axis of the pump shaft, whereby pressure is exerted to clamp the parts together against rotative movement and against longitudinal movement of the pump body in respect to the driving shaft.

2. A device for mounting a pump on the front end of a motor vehicle with the pump shaft in alinement with and coupled to a motor shaft consisting of substantially concentric members, one on the vehicle and the other on the pump, means to lock these members together against relative longitudinal movement, said means comprising a screw carried by the pump, the axis of the screw being in a plane at substantially right angles to the axis of the motor shaft and on a line passing substantially through said axis.

3. In combination, a support, a driving shaft, a pump body, a pump shaft projecting from the body in substantial alinement with the driving shaft and rotatable with the latter, and a screw having its axis in a plane at an angle to the axis of the pump shaft, whereby pressure is exerted to clamp the parts together against rotative movement and against longitudinal movement of the pump body in respect to the driving shaft.

4. In combination, a driving shaft, a pump body having a tubular collar, a pump shaft passing through the collar and projecting therefrom, tubular means with which the collar engages to form a support for the body, means for coupling the pump shaft to the driving shaft when the collar is engaged with the tubular means, and means for detachably securing the body in the position in which the collar engages the tubular means, said last mentioned means being movable toward and from the axis of the pump shaft in a plane at substantially right angles thereto.

5. In combination, a driving shaft, a pump body having a tubular collar, a pump shaft passing through the collar and projecting therefrom, supporting means with which the collar engages to form a support for the body, means for coupling the pump shaft to the driving shaft when the collar is engaged with the supporting means, and means for detachably securing the body in the position in which the collar engages the supporting means, said securing means being movable toward and from the axis of the pump shaft in a plane at substantially right angles thereto, the arrangement being such that the pump shaft is allowed limited swinging movement in respect to the axis of the driving shaft whereby the coupling means may be brought into position to couple the pump shaft to the driving shaft.

In testimony whereof I affix my signature in the presence of two witnesses.

SILAS A. STRICKLAND.

Witnesses:
ANNA M. DORR,
C. R. STICKNEY.